July 2, 1929.　　　　　E. DICKEY　　　　　1,719,102

ENGINE STARTING APPARATUS

Filed July 30, 1925

Inventor

Ernest Dickey

By Spencer Small & Hardman his Attorneys

Patented July 2, 1929.

1,719,102

UNITED STATES PATENT OFFICE.

ERNEST DICKEY, OF DAYTON, OHIO, ASSIGNOR TO DELCO-LIGHT COMPANY, OF DAYTON, OHIO, A CORPORATION OF DELAWARE.

ENGINE-STARTING APPARATUS.

Application filed July 30, 1925. Serial No. 47,015.

This invention relates to engine starting apparatus of the type wherein a friction wheel operated by an electric motor is moved manually into contact with a friction wheel connected with the engine to be started.

The objects of the invention include simplifying the construction of apparatus of this type, in order to reduce the cost of manufacture.

A further object is to provide for closing an electric switch, which controls the motor, only after the motor friction wheel is urged against the engine friction wheel with a pressure which is sufficient to assure a driving engagement between the friction wheels without material slipping.

Further objects and advantages of the present invention will be apparent from the following description, reference being had to the accompanying drawings, wherein a preferred form of the present invention is clearly shown.

Figures 1, 3:
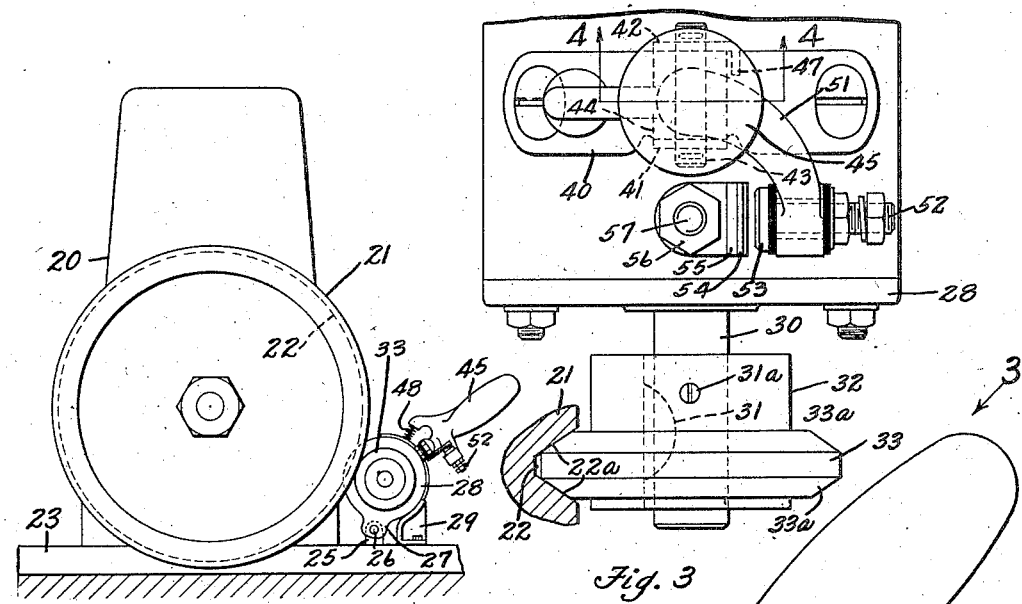
Fig. 1 is an end view of an internal-combustion engine provided with a form of the improved starting apparatus, the motor wheel being out of contact with the engine wheel.
Fig. 3 is a fragmentary top view of the starting motor and switch, looking in the direction of the arrow 3 in Fig. 2.
Figures 2, 4:
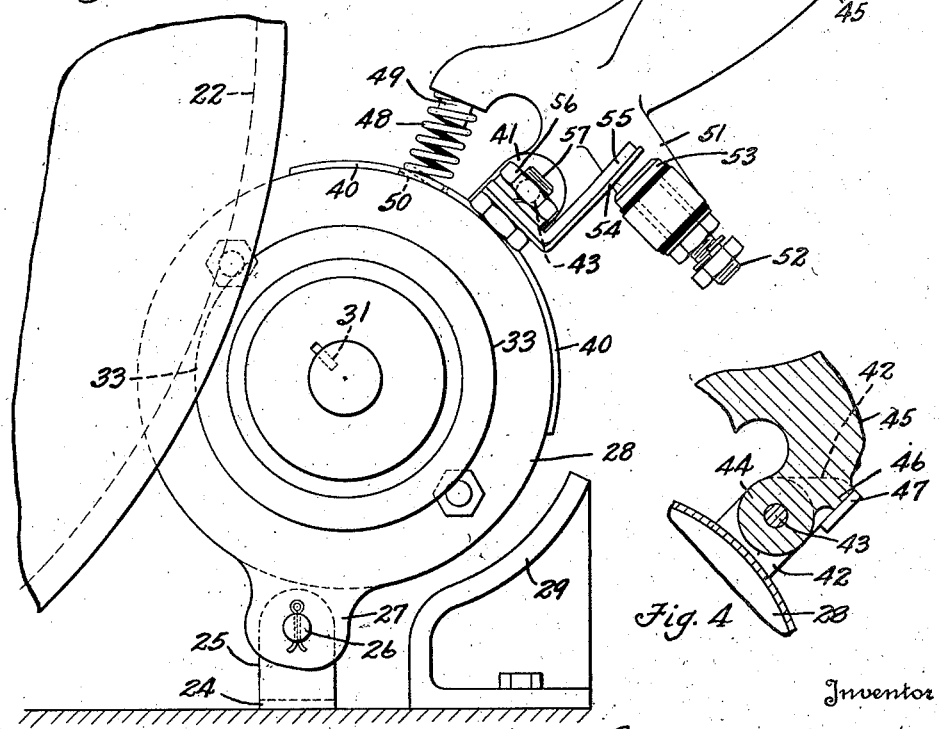
Fig. 2 is a fragmentary view looking at the same end of the engine shown in Fig. 1, the motor wheel having been moved into contact with the engine wheel, but not with sufficient pressure to cause the motor switch to be closed.
Fig. 4 is a fragmentary sectional view on the line 4—4 of Fig. 3.

Referring to the drawings, 20 designates an internal combustion engine having a flywheel 21 which is provided with a V-groove, the bottom of which is indicated by the broken-line circle 22 in Figs. 1 and 2. Fig. 3 shows a fragmentary section of the flywheel 21, taken through the groove designated 22 in this figure. The engine 20 is supported by a base 23 which supports also a bracket 24 having two upright posts in alignment, one of the posts being indicated at 25 in Figs. 1 and 2. These posts support a rod 26 which passes through parallel-spaced lugs, one being indicated at 27. These lugs 27 are provided by the frame 28 of an electric motor. The frame 28 normally rests against a bracket 29 also supported by the base 23. Frame 28 supports the motor shaft 30 to which is attached by a key 31 and a screw 31ª the hub 32 of a friction wheel 33, which is made of suitable friction material. For this purpose a composition of asbestos and rubber has been found satisfactory. The friction wheel 33 is provided with conical surfaces 33ª for engaging similar conical surfaces 22ª, which define the flywheel groove 22.

The motor frame 28 supports a bracket 40 provided with parallel posts 41 and 42 which support a rod 43 which passes through the hub 44 of a handle 45. Handle 45 is provided with a lug 46 which normally bears against a stop 47 provided by the post 42. The handle is held in this position normally by a spring 48 which, at one end, encircles a lug 49 extending from the handle 45 and which bears at the other end against the motor frame 28. The lower end of the spring is received within a hole 50 provided by the bracket 40 in order to prevent accidental dislocation of the spring. The handle 45 includes an arm 51 which insulatingly supports a terminal screw 52 having a head 53 which provides a switch contact. The contact 53 engages an L-shaped contact member 54 which is backed by an L-shaped bracket 55. The contact 54 and the bracket 55 are attached by nut 56 to a terminal screw 57. The lower end of the screw 57 is attached to one of the motor windings (not shown), the terminal 57 being insulatingly supported by the frame 28. One terminal of a battery, or other current source, is connected with the terminal screw 52, and the other terminal of the current source is connected with another terminal carried by the motor frame 28. This terminal is not shown, but it will be understood that it may resemble the terminal 57.

To operate the starter, the handle 45 is pulled upwardly and toward the engine wheel 21. The motor wheel 33 will move from the position shown in Fig. 1, to that shown in Fig. 2, but during this movement the spring 48 will resist the movement of the contact 53 into engagement with the contact 54. In order to close the motor switch, the handle 45 must be moved relative to the motor frame 28 after the friction wheels have been moved into engagement. This further movement of the handle 45 will cause the spring 48 to be compressed beyond its initial state of compression and to transmit additional force, tending to move the motor frame 28 counterclockwise about the pivot rod 46. The spring 48 is constructed so that, when the handle 45 has been moved relative to the frame 28 to cause the contact 53 to engage the contact 54, the friction wheel 33 will be urged into engagement with the engine wheel 21 with sufficient pressure to insure a driving engagement without material slipping.

By means of the present invention the motor circuit is not completed until after the driving connection between the motor and engine has been established. After the engine has been started, the handle 45 is released and the motor frame 28 will fall by gravity into contact with the support 29. The motor wheel 33 will move out of engagement with the engine wheel 21 and the contact 53 will be separated by the spring 48 from the contact 54.

From the present invention it is apparent that with a small additional cost, the electric motor is provided with friction gearing to drive the internal-combustion engine and with an electric switch which is operated by the handle which moves the motor gear into contact with the engine gear.

While the form of embodiment of the invention as herein disclosed, constitutes a preferred form, it is to be understood that other forms might be adopted, all coming within the scope of the claims which follow.

What is claimed is as follows:

1. Engine starting apparatus comprising, in combination, a friction wheel connected with the engine, an electric motor, a friction wheel connected with the motor and movable into contact with the engine wheel, a motor switch, a handle for moving the motor wheel into contact with the engine wheel and for closing said switch, and means for holding said switch open until the motor wheel is urged by movement of the handle against the engine wheel with a certain pressure.

2. Engine starting apparatus comprising, in combination, a friction wheel connected with the engine, an electric motor, a friction wheel connected with the motor and movable into contact with the engine wheel, a motor switch, a handle for moving the motor wheel into contact with the engine wheel and for closing said switch, and a spring tending to hold the switch contacts apart but yielding under movement of the handle to permit the contacts to close after the motor is urged against the engine wheel with a certain pressure.

3. Engine starting apparatus comprising, in combination, a friction wheel connected with the engine, an electric motor, a friction wheel connected with the motor and movable into contact with the engine wheel, a motor switch, a handle for moving the motor wheel into contact with the engine wheel and for closing said switch, and a spring through which force is applied from the handle to move the motor wheel and by which the closing of the contacts is resisted, the contacts being permitted to close after the motor wheel is pressed against the engine wheel with a certain force.

4. Engine starting apparatus comprising, in combination, a wheel connected to the engine, an electric motor, a wheel driven by the motor and movable into contact with the engine wheel, a switch controlling the motor and movable as a whole with the motor wheel, and a handle movable to place the motor wheel in engagement with the engine wheel, the handle being capable of further movement to close the switch.

5. Engine starting apparatus comprising, in combination, a wheel connected with the engine, an electric motor having a movably-mounted frame, a wheel driven by the motor and supported by the motor frame for movement into driving engagement with the engine wheel, a motor switch supported wholly by the motor frame, and a handle movable to place the motor wheel and engine wheel in contact, and capable of further movement to close the switch.

6. Engine starting apparatus comprising, in combination, a wheel connected with the engine, an electric motor having a movably-mounted frame, a wheel driven by the motor and supported by the motor frame for movement into driving engagement with the engine wheel, a motor switch supported wholly by the motor frame, and a handle supported by the motor frame for moving the motor fame and movable relative to the motor frame for closing said switch.

7. Engine starting apparatus comprising, in combination, a wheel connected with the engine, an electric motor having a pivotally-mounted frame, a wheel driven by the motor and carried by the motor frame for movement into driving engagement with the engine wheel, a handle pivotally attached to the frame, cooperating switch contacts, one carried by the handle and the other by the frame, and a spring resisting closing of the contacts.

8. Engine starting apparatus comprising, in combination, a wheel connected with the engine, an electric motor having a movably-mounted frame, a wheel driven by the motor and supported by the motor frame for movement into driving engagement with the engine wheel, a handle for moving the motor frame, and cooperating switch contacts, one carried by the handle and the other by the motor frame.

In testimony whereof I hereto affix my signature.

ERNEST DICKEY.